United States Patent
Ramkumar et al.

(10) Patent No.: US 9,148,236 B2
(45) Date of Patent: Sep. 29, 2015

(54) OPTIMIZED HARQ RECOMBINING WITHIN TRANSMISSION WINDOW

(71) Applicant: QUALCOMM Incorporated, San Diego, CA (US)

(72) Inventors: Vasanth Kumar Ramkumar, San Diego, CA (US); Muralidharan Murugan, San Diego, CA (US); Pratik Kotkar, San Diego, CA (US); Aparna S. Ghorpade, San Diego, CA (US); Srinivasan Rajagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 13/802,001

(22) Filed: Mar. 13, 2013

(65) Prior Publication Data

US 2014/0086145 A1 Mar. 27, 2014

Related U.S. Application Data

(60) Provisional application No. 61/705,054, filed on Sep. 24, 2012.

(51) Int. Cl.
*H04H 20/16* (2008.01)
*H04L 1/08* (2006.01)
*H04L 1/18* (2006.01)

(52) U.S. Cl.
CPC ............. *H04H 20/16* (2013.01); *H04L 1/08* (2013.01); *H04L 1/189* (2013.01); *H04L 1/1832* (2013.01); *H04L 1/1864* (2013.01)

(58) Field of Classification Search
CPC ........ H04H 20/16; H04L 1/1832; H04L 1/08; H04L 1/1864; H04L 1/189
USPC ......... 370/229, 230, 231, 235, 310, 328, 338; 455/403, 422.1
See application file for complete search history.

(56) References Cited

U.S. PATENT DOCUMENTS

| 5,432,542 A | 7/1995 | Thibadeau et al. |
| 5,883,581 A | 3/1999 | Dorenbosch et al. |

(Continued)

FOREIGN PATENT DOCUMENTS

| EP | 1211837 A1 | 6/2002 |
| EP | 2234313 A2 | 9/2010 |

OTHER PUBLICATIONS

International Search Report and Written Opinion—PCT/US2013/061472—ISA/EPO—Dec. 20, 2013.

*Primary Examiner* — Obaidul Huq
(74) *Attorney, Agent, or Firm* — Novak Druce Connolly Bove + Quigg LLP

(57) ABSTRACT

Techniques for optimized HARQ recombining are provided. In one exemplary embodiment, a method for wireless communication comprises receiving a broadcast message to determine a timing of a transmission window, receiving at least one transmission within the transmission window, and determining whether the at least one transmission is successfully decoded. The method further comprises instructing a lower protocol layer to ignore remaining transmissions within the transmission window upon a determination that the at least one transmission is successfully decoded, wherein the remaining transmissions and the at least one transmission comprise duplicate copies of a message segment.

45 Claims, 12 Drawing Sheets

(56) References Cited

U.S. PATENT DOCUMENTS

| | | |
|---|---|---|
| 6,609,097 B2 | 8/2003 | Costello et al. |
| 2001/0055290 A1* | 12/2001 | Seidel et al. ............. 370/337 |
| 2005/0003856 A1* | 1/2005 | Jang et al. ............. 455/553.1 |
| 2006/0248437 A1 | 11/2006 | Tiirola et al. |
| 2006/0282739 A1* | 12/2006 | Meyer et al. ............. 714/748 |
| 2007/0296575 A1 | 12/2007 | Eisold et al. |
| 2010/0183031 A1 | 7/2010 | Dalsgaard et al. |
| 2011/0305213 A1* | 12/2011 | Lohr et al. ............. 370/329 |
| 2012/0113831 A1 | 5/2012 | Pelletier et al. |
| 2012/0282875 A1* | 11/2012 | Park et al. ............. 455/404.1 |

\* cited by examiner

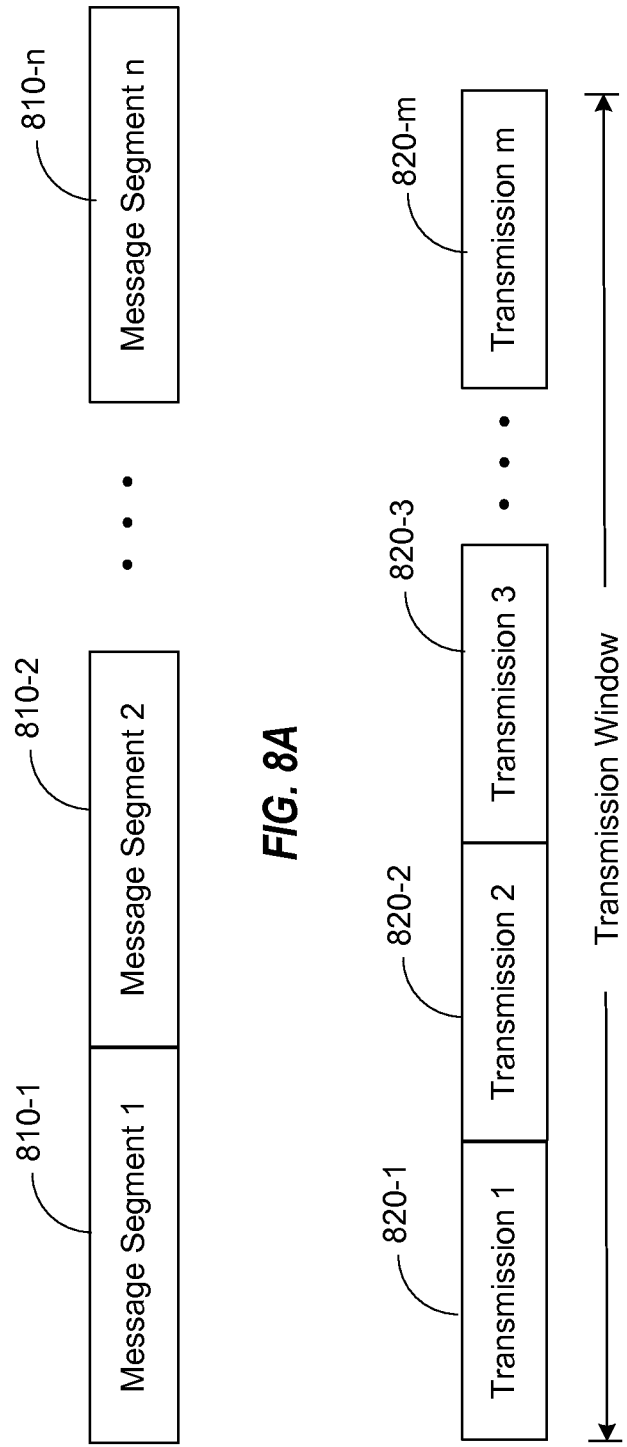

OPTIMIZED HARQ RECOMBINING WITHIN TRANSMISSION WINDOW

CROSS-REFERENCE TO RELATED APPLICATION

This application claims priority to U.S. Provisional Patent Application No. 61/705,054, entitled "OPTIMIZED HARQ RECOMBINING WITHIN SIB WINDOW," filed Sep. 24, 2012, which is expressly incorporated by reference herein in its entirety for all purposes.

BACKGROUND

1. Field

Aspects of the present disclosure relate generally to wireless communication systems, and more particularly, to techniques for HARQ recombining.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile devices or mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile devices, such as UEs.

In an LTE network, one or more base stations may broadcast a public warning message to mobile devices to notify the respective users of a natural disaster or other emergency. For example, one or more base stations may broadcast an earthquake and tsunami warning system (ETWS) message to warn the users of an earthquake or tsunami. The warning message may be divided into a plurality of message segments, in which a base station broadcasts each message segment within a scheduled transmission window to mobile devices within the base station's coverage area.

To ensure that even a mobile device experiencing poor channel conditions can successfully decode a message segment, the base station may transmit the message segment multiple times within the respective transmission window. The mobile device may recombine the multiple transmissions of the message segment (e.g., using HARQ recombining) to decode the message segment. The mobile device may then combine the decoded message segment with other decoded message segments to recover the entire warning message, and display the warning message to the respective user.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for wireless communication is described herein. The method comprises receiving a broadcast message to determine a timing of a transmission window, receiving at least one transmission within the transmission window, and determining whether the at least one transmission is successfully decoded. The method further comprises instructing a lower protocol layer to ignore remaining transmissions within the transmission window upon a determination that the at least one transmission is successfully decoded, wherein the remaining transmissions and the at least one transmission comprise duplicate copies of a message segment.

A second aspect relates to an apparatus for wireless communication. The apparatus comprises means for receiving a broadcast message to determine a timing of a transmission window, means for receiving at least one transmission within the transmission window, and means for determining whether the at least one transmission is successfully decoded. The apparatus further comprises means for instructing a lower protocol layer to ignore remaining transmissions within the transmission window upon a determination that the at least one transmission is successfully decoded, wherein the remaining transmissions and the at least one transmission comprise duplicate copies of a message segment.

A third aspect relates to a computer program product comprising a computer-readable medium comprising code for causing at least one computer to receive a broadcast message to determine a timing of a transmission window, to receive at least one transmission within the transmission window, and to determine whether the at least one transmission is successfully decoded. The code also causes the at least one computer to instruct a lower protocol layer to ignore remaining transmissions within the transmission window upon a determination that the at least one transmission is successfully decoded, wherein the remaining transmissions and the at least one transmission comprise duplicate copies of a message segment.

A fourth aspect relates to an apparatus for wireless communication. The apparatus comprises at least one transceiver configured to receive a broadcast message to determine a timing of a transmission window, and to receive at least one transmission within the transmission window. The apparatus also comprises at least one processor configured to determine whether the at least one transmission is successfully decoded, and to instruct a lower protocol layer to ignore remaining transmissions within the transmission window upon a determination that the at least one transmission is successfully decoded, wherein the remaining transmissions and the at least one transmission comprise duplicate copies of a message segment. The apparatus further comprises a memory coupled to the at least one processor.

To the accomplishment of the foregoing and related ends, the one or more embodiments comprise the features herein-after fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 8A illustrates segmentation of a message into multiple message segments.

FIG. 8B illustrates multiple transmissions of a message segment within a transmission window.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
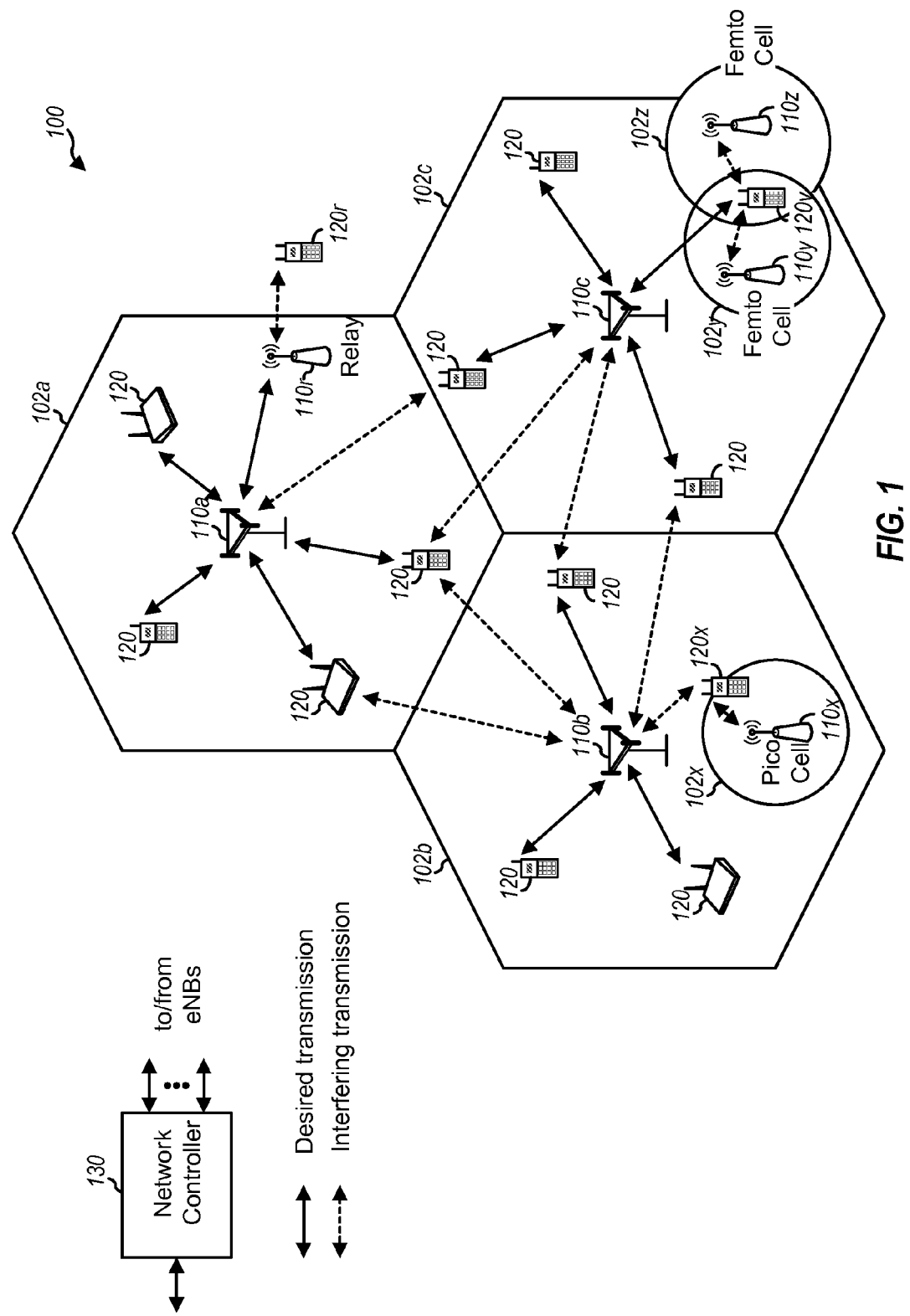
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with mobile entities (such as the UEs) and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. Broadcast multicast operations may require synchronization of base stations within a defined area, but the present technology is not limited thereby. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile devices. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
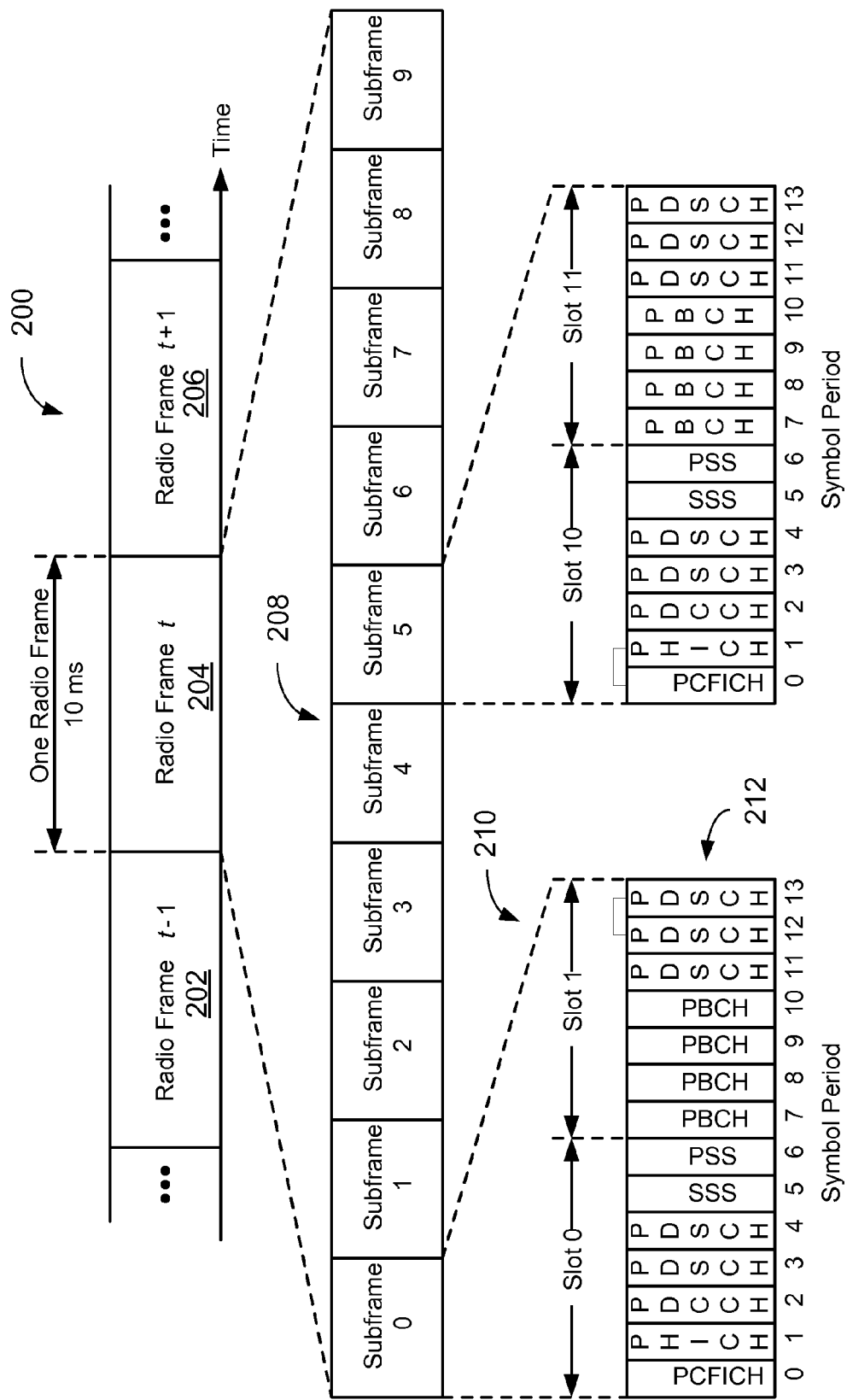
FIG. 2 is a block diagram conceptually illustrating an example of a down link frame structure in a telecommunications system.
Figure 6:
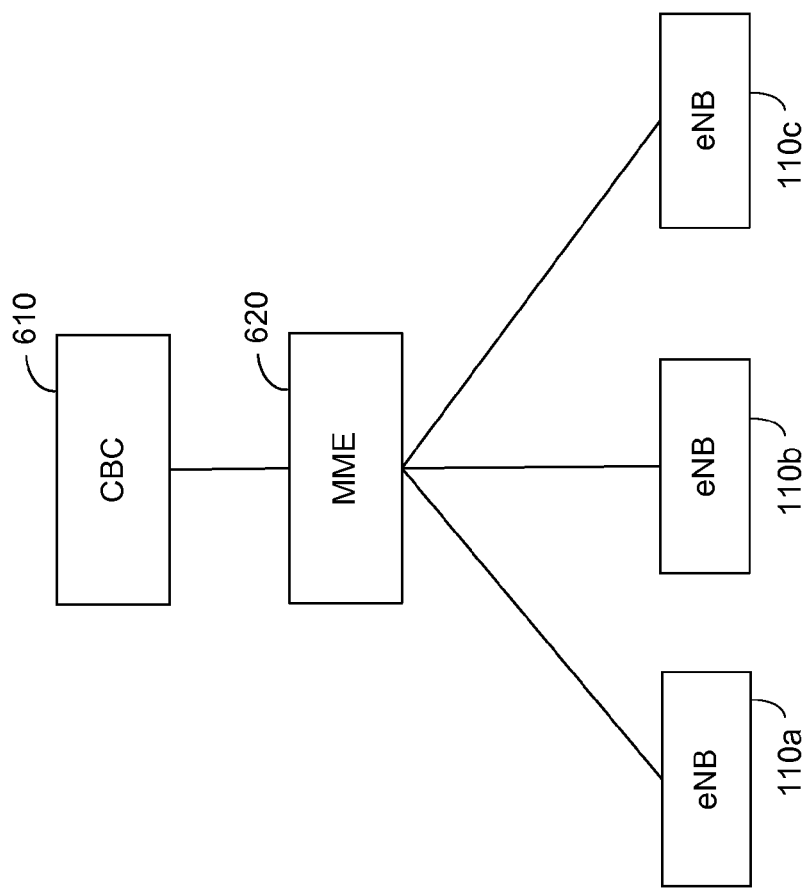
FIG. 6 illustrates an example of a system for distributing a warning message to UEs.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
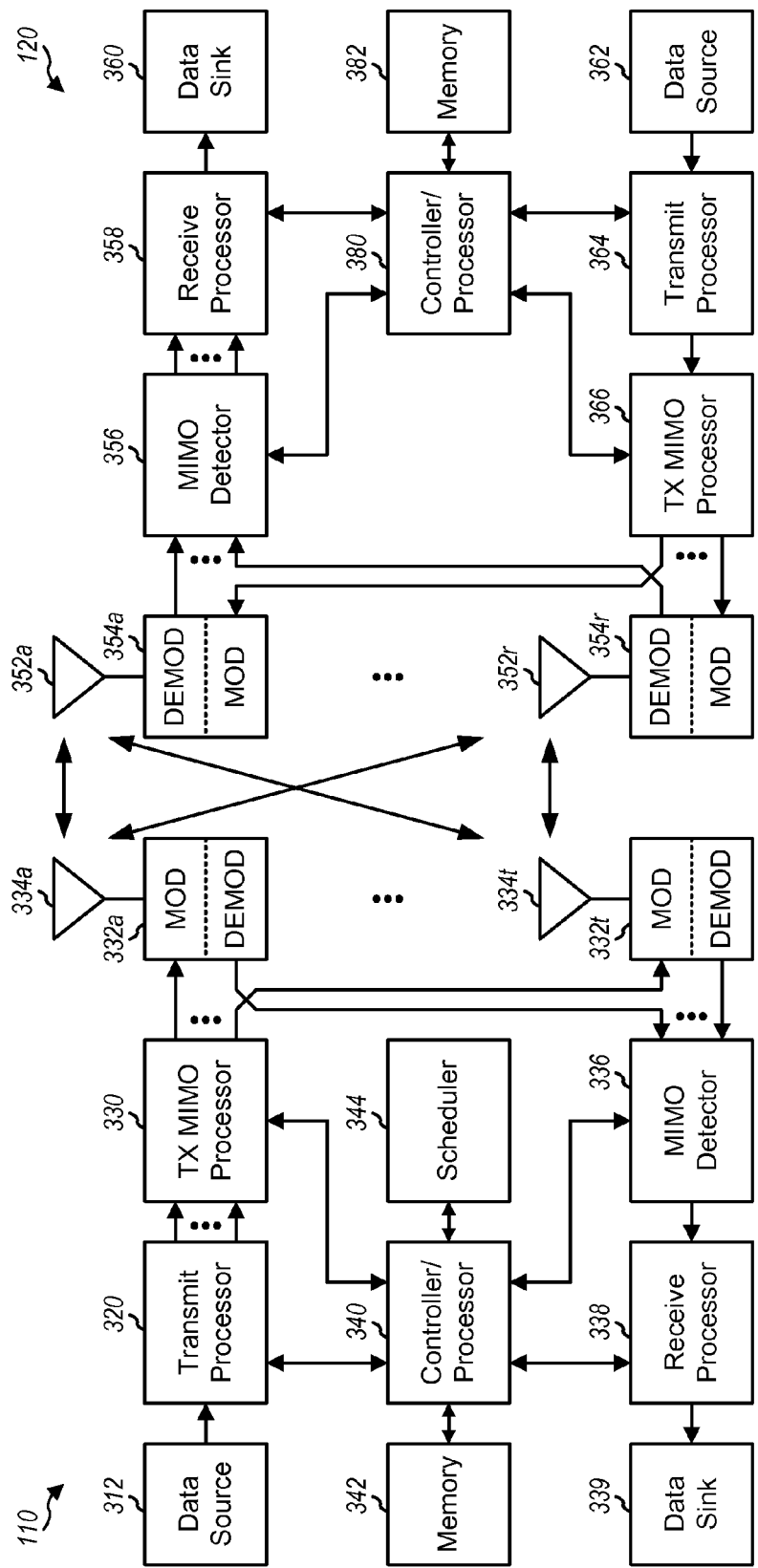
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
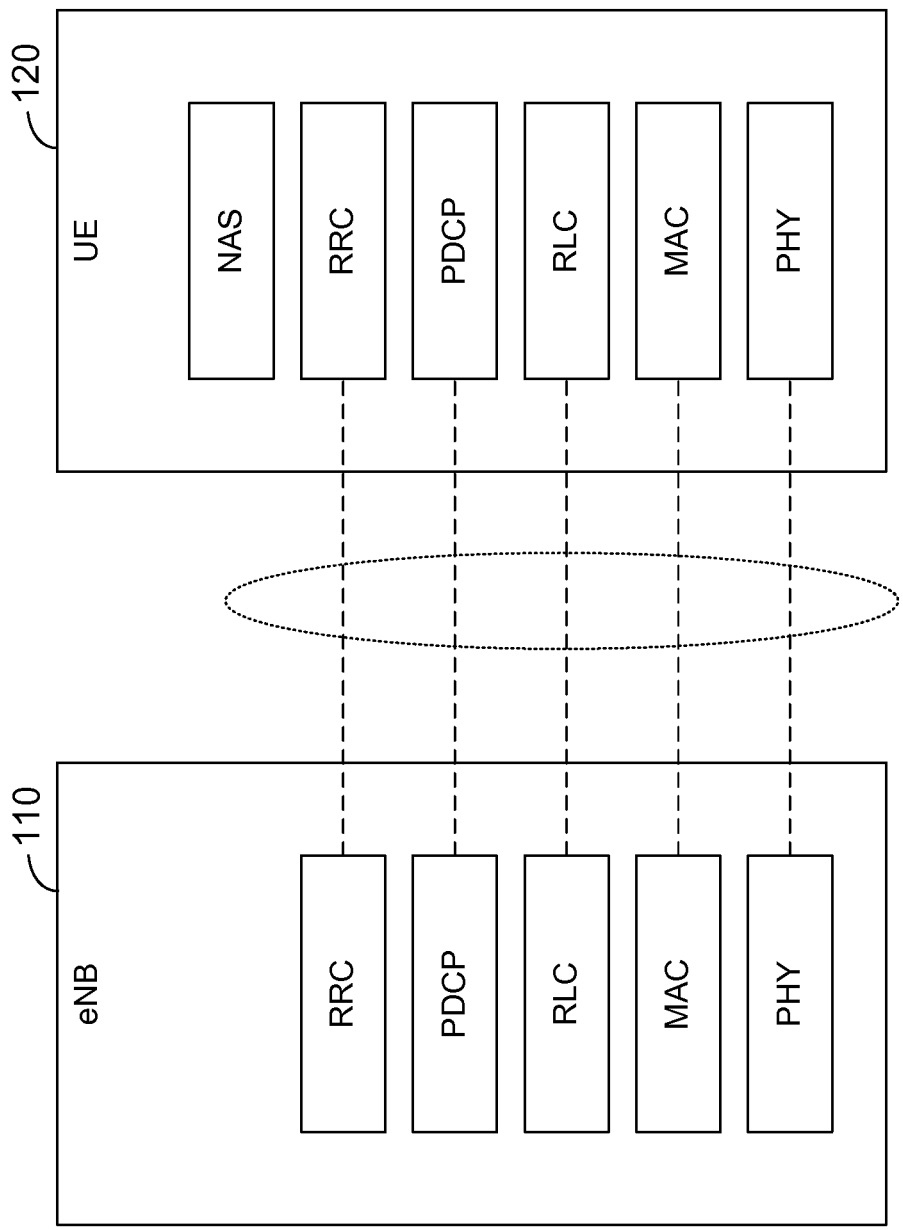
FIG. 4 illustrates an exemplary protocol stack for communications between the UE and eNB.

FIG. 4 illustrates an exemplary protocol stack for communications between the UE 110 and the eNB 120. The communication architecture between the UE 110 and the eNB 120 may include a communication protocol stack. The eNodeB 110 may include the RRC, PDCP, RLC, MAC, and PHY layers. The UE 120 may include the NAS, RRC, PDCP, RLC, MAC, and PHY layers. The communication may be via a Uu interface. The medium access control (MAC) layer may manage HARQ functions and perform data transport as a logical mapping. For example, the MAC layer may format the logical channels out of transport blocks for the higher layers. The HARQ may be performed in combination between the MAC and physical (PHY) layer to retransmit transport blocks for error recovery. The PHY layer performs the functions over the air interface, including communicating the information to and from the MAC transport channels. The PHY layer may retain and recombine transmissions for error recovery. The radio link control (RLC) layer may perform segmentation and reassembly of data. For example, the RLC may unpack an RLC protocol data unit (PDU) into RLC service data unit (SDUs), where the PDU size may be based on transport block size. The RLC layer may deliver data in-order to the higher layer (PDCP). The packet data convergence protocol (PDCP) may perform functions related to radio bearers such as packet data bearers and circuit-switched bearers. The radio resource control (RRC) layer performs UE management and control, including processing broadcast system information, paging, RRC connection management, integrity protection and ciphering, radio bearer control, mobility functions, UE measurement reporting and control of signal quality, and QoS management. The RRC may be in an RRC_Idle state when the radio on the device is not active, and RRC_Connected when the radio is in active operation, e.g., with the eNB. The non-access stratum NAS is a layer between the UE and MME (not shown). The NAS may include functions for mobility management, call control, session management, and identity management.

Figure 5:
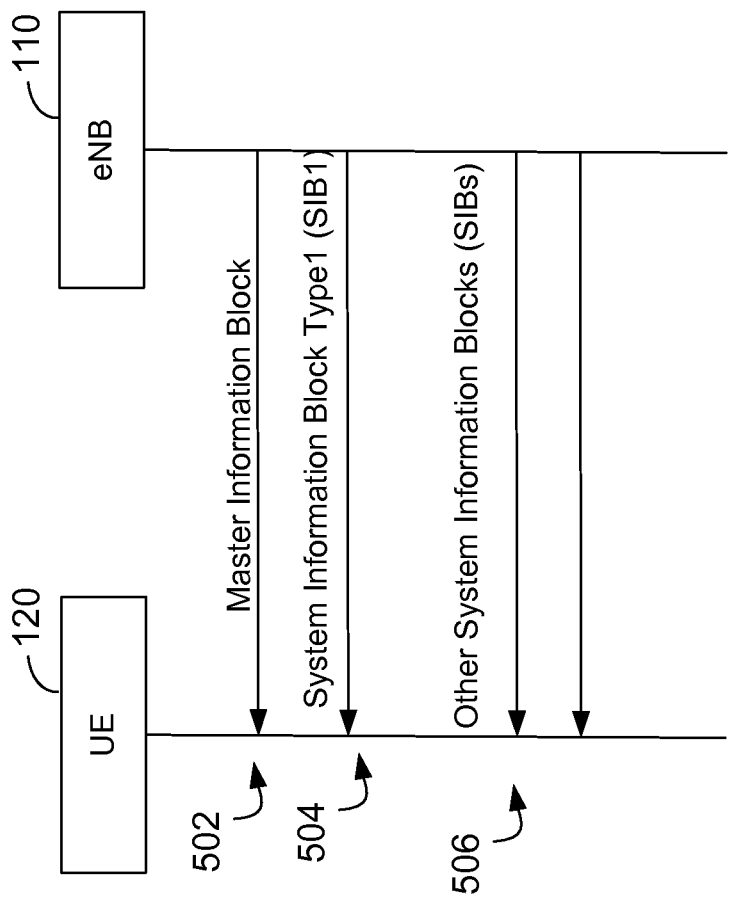
FIG. 5 illustrates delivery of system information from the eNB to the UE.

FIG. 5 illustrates an example of delivery of system information from the eNB 120 to the UE 110. The system information may be divided into a master information block (MIB) 502 and a number of system information (SI) blocks (SIBs). The MIB 502 may include parameters such as downlink bandwidth for resource blocks, PHICH configuration, and the system frame number. The SIBs may include system information block type 1 (SIB1) 504. The SIB1 may use a predetermined schedule and predetermined periodicity (e.g., 80 ms) so the UE 110 may know when to listen for the SIB1 message. Transmission of the first SIB1 may be scheduled in subframe #5 of the radio frames for which SFN mod 8=0, and the repetition may be scheduled in all radio frames for which SFN mod 2=0. SIB2 and above may be configurable with configurable window length and transmission periodicity. For example, the periodicity may be set to 8, 16, 32, 64, 128, 256, and 512 radio frames. SIB1 may include configuration values for these other SIBs 506. For example, SIB1 may include scheduling information for the other SIBs 506 indicating when the other SIBs 506 are to be transmitted. The SIBs may be grouped into a set of SI messages which may be transmitted with different periodicities.

SI messages corresponding to the SIBs may be transmitted within periodically occurring time domain windows using dynamic scheduling. Each SI message may be associated with a transmission window and the transmission windows of different SI messages may not overlap. For example, within one transmission window only the corresponding SI message may be transmitted. The length of a transmission window may be common for all SI messages, and may be configurable. To ensure that an SI message is received by the UE 120, the eNB 110 may transmit the SI message multiple times within a transmission window. The UE 120 may treat the first transmission within a transmission window as a new transmission. A transmission window may also be referred to as an SI window.

The eNB 110 may broadcast a warning message in one or more system information blocks (SIBs) to UEs within the eNB's coverage area. For example, the eNB 110 may broadcast an earthquake and tsunami warning system (ETWS) message to warn users of the UEs of an earthquake or tsunami. The ETWS message may include a first message and a second message. The first message may be transmitted in system information block type 10 (SIB10) to alert users of an approaching threat, such as an imminent earthquake or tsunami. The second message may be transmitted in system information block type 11 (SIB11) to provide users with additional or supplemental information regarding the threat, such as instructions and guidance for responding to the threat. The first message may be called a Primary Notification and the second message may be called a Secondary Notification.

FIG. 6 shows an example of a network 600 for distributing an ETWS message to UE users. The network 600 may be part of an LTE network, and may include a cell broadcast service (CBS) 610, a mobility management entity (MME) 620, and one or more eNBs 110*a*-110*c* coupled to the MME 620. When an emergency occurs, the CBS 610 may receive an ETWS message for distribution to UE users from a governmental agency that monitors for the emergency. The CBS 610 may then send the ETWS message to one or more eNBs 110*a*-110*c* having coverage areas overlapping a geographical area impacted by the emergency. Each of the eNBs 110 receiving the ETWS message may then broadcast the ETWS message to UEs within the eNB's coverage area. If the ETWS message includes a Primary Notification and a Secondary Notification, then each eNB 110 may immediately broadcast the Primary Notification to quickly notify UE users of the emergency. The Primary Notification may be followed by the Secondary Notification to provide the UE users with additional information concerning the emergency. The Primary Notification and the Secondary Notification may be broadcast on a common channel shared by the UEs (e.g., a down-link shared channel (DL-SCH)), a broadcast channel (BCH), etc.

Figure 7:
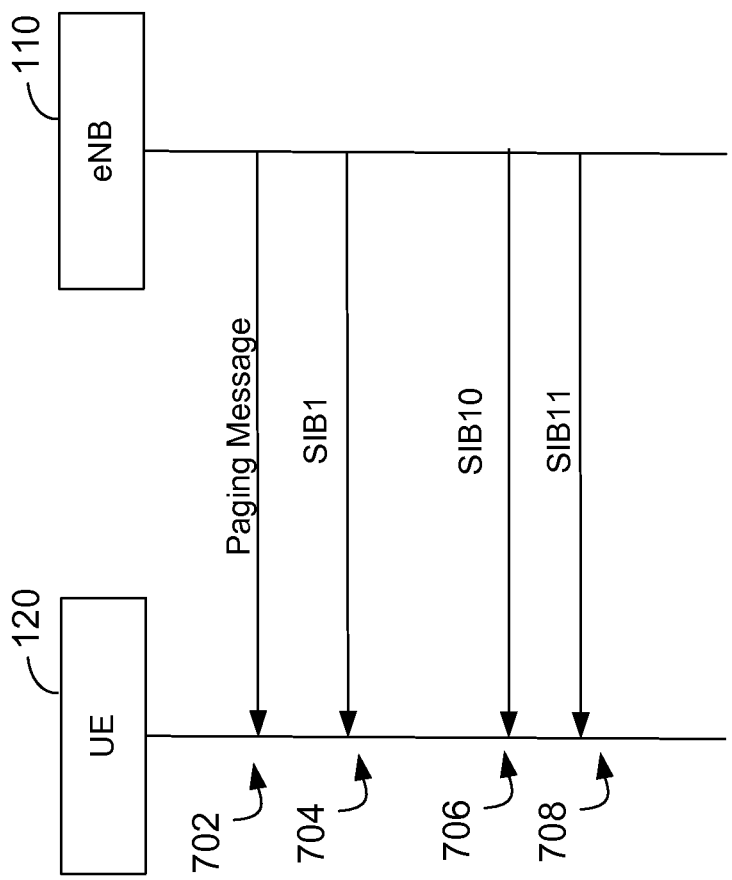
FIG. 7 illustrates delivery of a warning message from the eNB to the UE.

FIG. 7 illustrates an example of delivery of an ETWS message from the eNB 110 to the UE 120. When the eNB 110 has an ETWS message to broadcast, the eNB 110 may broadcast a paging message 702 with an ETWS notification indicating that there is an ETWS message. The UE 120 may monitor a paging channel for the paging message 702 when the UE 120 is in an RRC_Connected state or an RRC_Idle state. Upon receiving the paging message 702, the UE 120 may check the paging message to determine whether the ETWS notification is present. For example, when the UE 120 is in the RRC_Connected state, the UE 110 may periodically monitor the paging channel for a paging message from the network (e.g., at least once every defaultPageCycle) to check whether a ETWS notification is present.

Upon detecting the ETWS notification, the UE 120 may receive SIB1 704 from the eNB 110 for scheduling information indicating when the ETWS message will be transmitted. For example, the ETWS message may include a Primary Notification and a Secondary Notification, and the SIB1 704 may include scheduling information for both notifications (e.g., in a schedulingInforList in the SIB1 704). The UE 110 may then receive the Primary Notification in the SIB10 706 and the Secondary Notification in the SIB11 708 according to the scheduling information in the SIB1 704.

FIG. 8A illustrates an example of segmentation of a message for broadcast from the eNB 110 to UEs. The message may be a Secondary Notification of an ETWS message to be transmitted in SIB11. As shown in FIG. 8A, the message may be divided into n message segments 810-1 through 810-*n*. The message segments 810-1 through 810-*n* may have equal lengths or different lengths. The eNB 110 may encode the message segments 810-1 through 810-*n* for transmission, and transmit the encoded message segments in different transmission windows. Each encoded message segment may be transmitted multiple times within the respective transmission window, as discussed further below. The eNB 110 may broadcast scheduling information in the SIB1 indicating when the transmission windows for the message segments will occur.

FIG. 8B illustrates an example in which an encoded message segment is transmitted multiple times within the respective transmission window. In this example, the encoded message segment is transmitted multiple times in m transmissions 820-1 through 820-*m* within the respective transmission window, where each transmission 820-1 through 820-*m* may include a copy of the message segment. The message segment may be transmitted multiple times to ensure that even an UE experiencing poor channel conditions is able to successfully decode the message segment.

For each message segment, the UE 120 may determine when the respective transmission window will occur from the scheduling information in the SIB1. During the transmission window, the UE 120 may receive all of the transmissions 820-1 through 820-*m* within the transmission window. The UE 120 may treat the first transmission 820-1 within the transmission window as the first transmission of the message segment, and treat each subsequent transmission 820-2 through 820-*m* within the transmission window as a retransmission of the message segment. The UE 120 may then recombine the received transmissions 820-1 through 820-*m* using broadcast HARQ recombining or another technique, and decode the message segment using the recombined transmissions. The recombination of multiple transmissions increases the probability of successfully decoding the message segment.

After decoding all of the message segments of a message (e.g., Secondary Notification), the UE 120 may assemble the decoded message segments into the entire message. In one embodiment, the last message segment may include a last-segment indicator, and the UE 120 may assemble the message segments into the message upon detecting the last-segment indicator. The message may be forwarded to an upper protocol layer (e.g., application layer) that translates the message into user-readable text for display to the user.

Broadcast HARQ recombining may recombine multiple transmissions to improve decoding in a similar manner as HARQ recombining for unicast transmission of user data. However, unlike unicast HARQ recombining, the eNB 110 does not wait to receive a retransmission request (e.g., a negative acknowledgement (NACK)) from a UE 120 before retransmitting to a message segment. Instead, the eNB 110 automatically transmits a message segment multiple times within the respective transmission window without having to receive a retransmission request. In this case, a UE 120 may automatically treat the first transmission within the transmission window as a first transmission of the message segment, and treat each subsequent transmission within the transmission window as a retransmission of the message segment. Thus, it may be understood by the UE 120 that transmissions within the same transmission window correspond to the same message segment, and therefore that transmissions within the same transmission window can be recombined (e.g., using HARQ recombining). For this to work, the eNB 110 may not schedule transmissions for different message segments within the same transmission window.

As discussed above, the eNB 110 may transmit a message segment multiple times within the respective transmission window to ensure that even a UE 120 experiencing poor channel conditions is able to successfully decode the message segment. However, a UE 120 experiencing good channel conditions may be able to successfully decode the message segment using fewer transmissions (e.g., one transmission). As a result, the UE 120 wastes power receiving and recombining more transmissions than needed by the UE 120 to decode the message segment, thereby reducing the battery life of the UE 120.

To address this, embodiments of the present disclosure provide a UE 120 that attempts to decode a message segment after receiving one or more transmissions of the message segment within the respective transmission window, and ignores the remaining transmissions of the message segment within the transmission window when the message segment has been successfully decoded. As a result, the UE 120 avoids wasting power receiving and recombining the remaining transmissions, which may not be needed to decode the message segment.

In one embodiment, the UE 120 receives, from an eNB 110, scheduling information (e.g., in SIB1) for a transmission window within which a message segment is to be transmitted multiple times. At the scheduled transmission time of the transmission window, the UE 120 may receive the first transmission of the message segment within the transmission window and attempt to decode the message segment using the first transmission. If the UE 120 successfully decodes the message segment, then the UE 120 may ignore the remaining transmissions within the transmission window. In this case, the UE may not need to initiate HARQ recombining to decode the message segment, thereby reducing power consumption.

If the UE 120 is unable to decode the message segment from the first transmission, then the UE 120 may receive a subsequent transmission (retransmission of the message segment) within the transmission window, and recombine the subsequent transmission with the first transmission (e.g., using HARQ recombining). The UE 120 may then attempt to decode the message segment using the recombined transmissions. If the UE 120 successfully decodes the message segment, then the UE 120 may ignore the remaining transmissions within the transmission window.

If the UE 120 is still unable to decode the message segment, then the UE 120 may receive the next transmission within the transmission window, and recombine the next transmission with the previous two transmissions (e.g., using HARQ recombining). The UE 120 may then attempt to decode the message segment using the recombined transmissions. If the UE 120 successfully decodes the message, then the UE 120 may ignore the remaining transmissions within the transmission window. If the UE 120 is still unable to decode the message segment, then the UE 120 may repeat the above operations until the message segment is successfully decoded or all of the transmissions within the respective transmission window have been received. This way, the UE 120 may receive only the number of transmissions needed by the UE 120 to decode the message segment, thereby conserving power. The power savings increases when the UE 120 operates under good channel conditions, and therefore needs fewer transmissions to decode the message segment.

In one embodiment, the UE 120 ignores the remaining transmissions within a transmission window by halting the reception and decoding of the remaining transmissions. This may involve turning off components in the UE 120 associated with receiving and decoding transmissions for the remaining duration of the transmission window and/or until the next scheduled transmission window. Referring to the example in FIG. 3, this may involve turning off components in the demodulators 354a through 354r, the MIMO detector 356, and/or receive processor 358 in the UE 120. The UE 120 may determine the remaining duration of the transmission window based on the time elapsed from the start of the transmission window and the length of the transmission window, which may be provided by the scheduling information or may be a default length.

The UE 120 may restart receiving and decoding transmissions at the start of the next scheduled transmission window to receive and decode the next message segment. For example, the UE 120 may turn on components in the demodulators 354a through 354r, the MIMO detector 356 and/or the receive processor 358 at the start of the next scheduled transmission window, in which the start time of the next transmission window is provided by the scheduling information from the eNB 110 (e.g., scheduling information in SIB1).

In one embodiment, the UE 120 may receive and decode transmissions at the physical (PHY) layer and determine whether to ignore remaining transmissions within a transmission window at the radio resource control (RRC) layer or a higher protocol layer. For example, the UE 120 may determine at the RRC layer to ignore the remaining transmissions when the message segment associated with the transmission window has been successfully decoded at the PHY layer.

When the UE 120 determines to ignore the remaining transmissions within a transmission window (after successful decoding), the RRC layer or higher protocol layer may instruct the PHY layer to ignore the remaining transmissions within the transmission window. For example, the RRC layer or higher protocol layer may instruct components associated with the PHY layer to turn off or go into an idle state for the remaining duration of the transmission window. Referring to the example in FIG. 3, operations at the PHY layer may performed by the demodulator 354a through 354r, the MIMO detector 356 and the receive processor 358, while operations at the RRC layer or higher protocol layer may be performed by the controller/processor 380.

In one embodiment, the UE 120 may begin receiving a subsequent transmission while making a determination whether the message segment has been successfully decoded using one or more previous transmissions. The UE 120 may store data from the subsequent transmission in a memory as they are received. If the UE 120 determines that the message segment has been successfully decoded using the one or more previous transmissions, then the UE 120 may discard the data from the subsequent transmission that has already received. In this case, the data may be discarded before being used for recombining and/or decoding. If the UE 120 determines that the message segment has not been successfully decoded, then the UE 120 may finish receiving the subsequent transmission, recombine the subsequent transmission with the one or more previous transmission, and make another attempt to decode the message segment using the recombined transmissions.

In one embodiment, the eNB 110 may include error-detection code (e.g., cyclic redundancy check (CRC)) in each transmission of a message segment to enable the UE 120 to determine when the message segment is successfully decoded. For example, the eNB 110 may calculate a CRC value or sequence based on the content of the message segment, append the CRC value to the message segment, and transmit the message segment with the appended CRC value in a transmission. Upon receiving the transmission, the UE 120 may attempt to decode the message segment, and perform an error check using the CRC value to determine whether the message segment has been successfully decoded. If the error check is passed, then the UE 120 may determine that the message segment has been successfully decoded and ignore the remaining transmissions within the transmission window. Otherwise, the UE 120 may receive a subsequent transmission within the transmission window, and make another attempt to decode the message segment using recombining (e.g., HARQ recombining).

Embodiments of the present disclosure may be used to optimize recombining for the Secondary Notification of an ETWS message sent in SIB11. As discussed above, an eNB 110 may transmit a segment of the Secondary Notification multiple times within a respective window, which may be referred to as a SIB11 window. The UE 120 may receive and attempt to decode the first transmission of the segment. If the UE 120 successfully decodes the segment, then the UE 120 may ignore the remaining transmissions of the segment. If the UE 120 does not successfully decode the segment, then the UE 120 may receive a subsequent transmission of the segment, recombine the subsequent transmission with the first transmission, and make another attempt to decode the segment using the recombined transmissions. If the UE 120 successfully decodes the segment, then the UE 120 may ignore the remaining transmissions within the transmission window. If the UE 120 still does not successfully decode the segment, then the UE 120 may repeat the above operations. Thus, once the UE 120 successfully decodes the segment, the UE 120 may ignore the remaining transmissions within the transmission window to conserver power.

Embodiments of the present disclosure may also be used to optimize recombining for a commercial mobile alert system (CMAS) message sent in system information block type 12 SIB12. The CMAS message may be used to alert UE users of an emergency, and may be issued by a governmental agency or entity, such as the National Weather Service, the President of the United States, etc. An eNB 110 may transmit a segment of the CMAS message multiple times within a respective window, which may be referred to as a SIB12 window. The UE 120 may receive and attempt to decode the first transmission of the segment. If the UE 120 successfully decodes the segment, then the UE 120 may ignore the remaining transmissions of the segment. If the UE 120 does not successfully decode the segment, then the UE 120 may receive a subsequent transmission of the segment, recombine the subsequent transmission with the first transmission, and make another attempt to decode the segment using the recombined transmissions. If the UE 120 successfully decodes the segment, then the UE 120 may ignore the remaining transmissions within the transmission window. If the UE 120 still does not successfully decode the segment, then the UE 120 may repeat the above operations until the segment is successfully decoded or all of the transmissions have been received.

It should be appreciated that embodiments of the present disclosure are not limited to the examples discussed above, and may be used to optimize recombining for any message or message segment that is transmitted multiple within a transmission window.

By way of example, methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 9A:
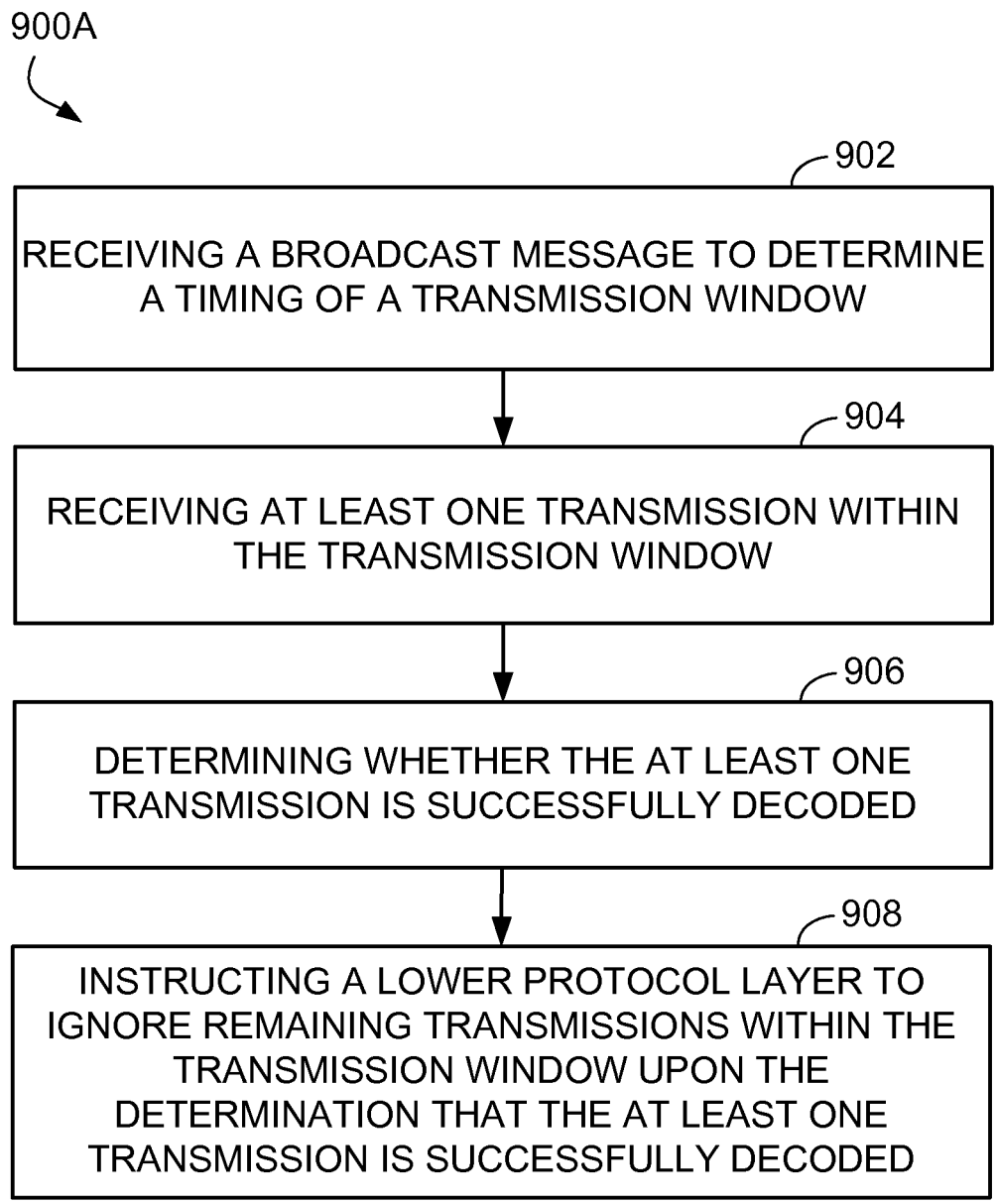
FIGS. 9A and 9B illustrate embodiments of a methodology for optimized recombining within a transmission window.

FIG. 9A illustrates a method 900A for optimized recombining within a transmission window according to embodiments of the present disclosure. The method 900A may be performed by a mobile entity (such as UE 120 of FIG. 1 and FIG. 3). The method 900A may include, at 902, receiving a broadcast message to determine a timing of a transmission window. For example, the broadcast message may be broadcast in SIB11 and may include scheduling information indicating when the transmission window is to occur.

The method 900A may also include, at 904, receiving at least one transmission within the transmission window. For example, the UE 120 may receive the at least one transmission during a time interval for the transmission window specified by the scheduling information.

The method 900A may further include, at 906, determining whether the at least one transmission is successfully decoded. For example, the UE 120 may determine that the at least one transmission is successfully decoded when an error check (e.g., CRC check) is passed.

The method 900A may further include, at 908, instructing a lower protocol layer to ignore remaining transmissions within the transmission window upon a determination that the at least one transmission is successfully decoded, wherein the remaining transmissions and the at least one transmission include duplicate copies of a message segment. For example, the determination may be made at a radio resource control (RRC) layer or higher protocol layer, and the RRC layer or high protocol layer may instruct a physical (PHY) layer to ignore remaining transmissions within the transmission window upon a determination that the at least one transmission is successfully decoded.

Figure 9B:
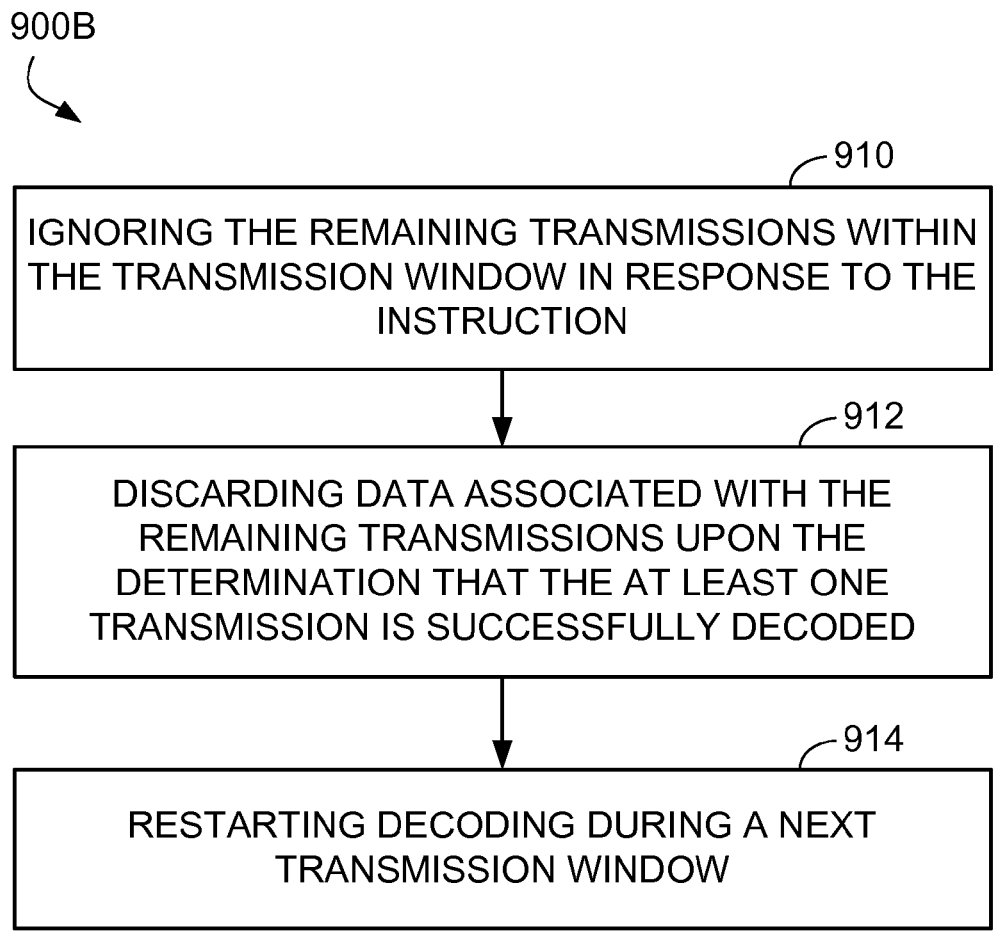

Additional operations 900B for optimized recombining within a transmission window are illustrated in FIG. 9B. One or more of the operations in FIG. 9B may optionally be performed as part of method 900A. The operations may be independently performed and are not mutually exclusive. Therefore any one of such operations may be performed regardless of whether another downstream or upstream operation is performed. For example, if the method 900A includes at least one of the operations illustrated in FIG. 9B, then the method 900A may terminate after the at least one operation, without necessarily having to include any of the other operation(s) illustrated in FIG. 9B.

The additional operations 900B may include, at 910, ignoring the remaining transmissions within the transmission window in response to the instruction at 908. For example, the PHY layer may ignore the remaining transmissions in response to the instruction from the RRC layer or higher protocol layer. The remaining transmissions may be ignored by halting the reception and decoding of transmissions for the remaining duration of the transmission window.

The additional operations 900B may include, at 912, discarding data associated with the remaining transmissions upon the determination that the at least one transmission is successfully decoded. For example, the UE 120 may have already received a portion of the remaining transmissions when the UE 120 determines that the at least one transmission has been successfully decoded. In this case, the UE 120 may discard the portion of the remaining transmission that has already been received.

The additional operations 900B may include, at 914, restarting decoding during a next transmission window. For example, when the UE 120 determines that the at least one transmission has been successfully decoded, the UE 120 may halt decoding until the next scheduled transmission window.

Figure 10A:
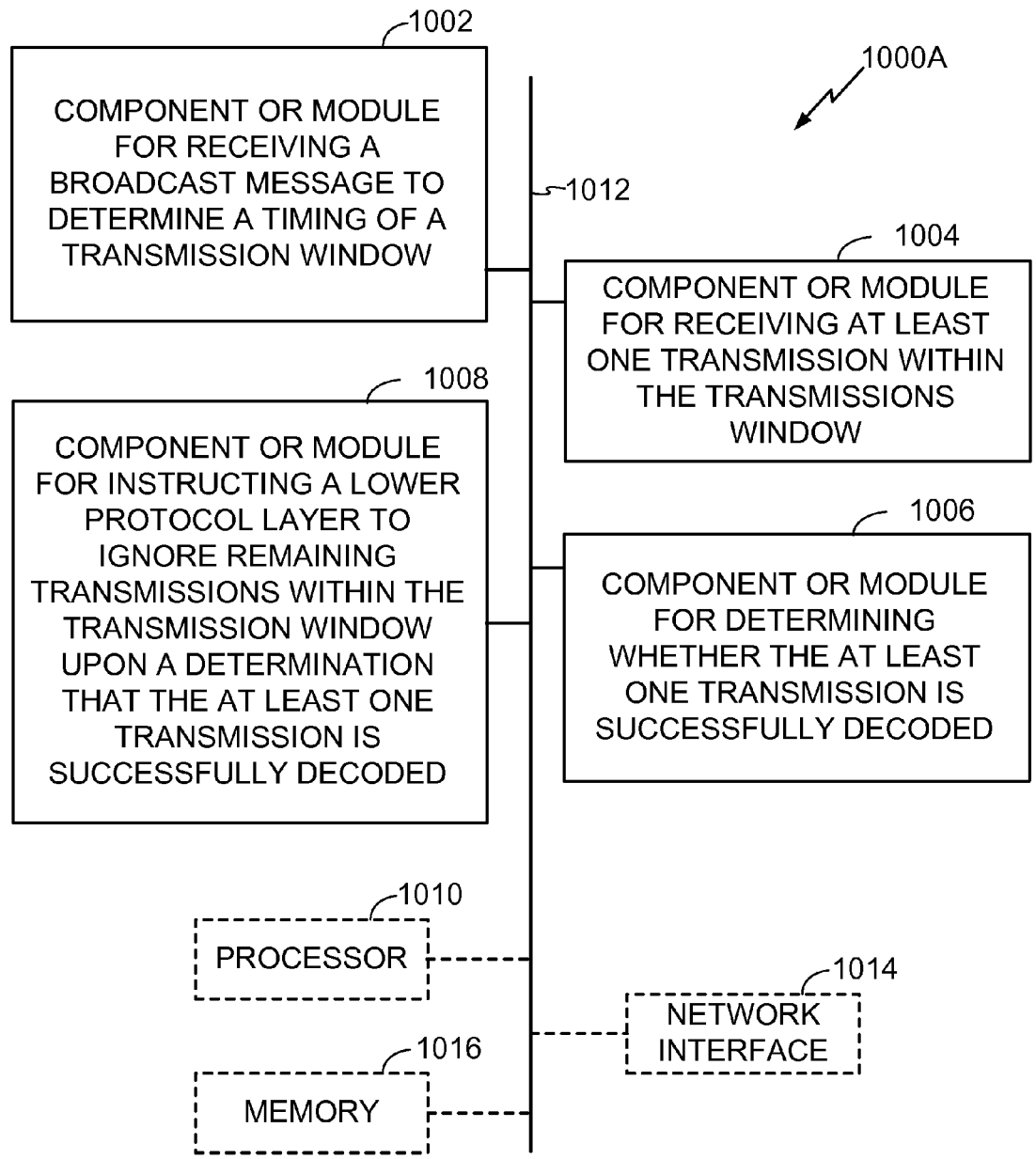
FIGS. 10A and 10B illustrate examples of an apparatus for implementing the methodologies of FIGS. 9A and 9B.

With reference to FIG. 10A, there is provided an exemplary apparatus 1000A that may be configured as a mobile entity (such as UE 120 of FIG. 1 and FIG. 3), or as a processor, component or similar device for use within the mobile entity, for optimized recombining within a transmission window. The apparatus 1000A may include functional blocks that can represent functions implemented by a processor, software, or combination thereof (e.g., firmware).

As illustrated, in one embodiment, the apparatus 1000A may include an electrical component or module 1002 for receiving a broadcast message to determine a timing of a transmission window. The apparatus 1000A may also include an electrical component or module 1004 for receiving at least one transmission within the transmission window, and an electrical component or module 1006 for determining whether at least one transmission is successfully decoded. The apparatus 1000A may further include an electrical component or module 1008 for instructing a lower protocol layer to ignore remaining transmissions within the transmission window upon a determination that the at least one transmission is successfully decoded.

In related aspects, the apparatus 1000A may optionally include a processor component 1010 having at least one processor, in the case of the apparatus 1000A configured as a mobile entity. The processor 1010, in such case, may be in operative communication with the components 1002-1008 or similar components via a bus 1012 or similar communication coupling. The processor 1010 may effect initiation and scheduling of the processes or functions performed by electrical components or modules 1002-1008.

In further related aspects, the apparatus 1000A may include a network interface component 1014 for communicating with other network entities. The apparatus 1000A may optionally include a component for storing information, such as, for example, a memory device/component 1016. The computer readable medium or the memory component 1016 may be operatively coupled to the other components of the apparatus 1000A via the bus 1012 or the like. The memory component 1016 may be adapted to store computer readable instructions and data for performing the activity of the components 1002-1008, and subcomponents thereof, or the processor 1010, or the methods disclosed herein. The memory component 1016 may retain instructions for executing functions associated with the components 1002-1008. While shown as being external to the memory 1016, it is to be understood that the components 1002-1008 can exist within the memory 1016.

Figure 10B:
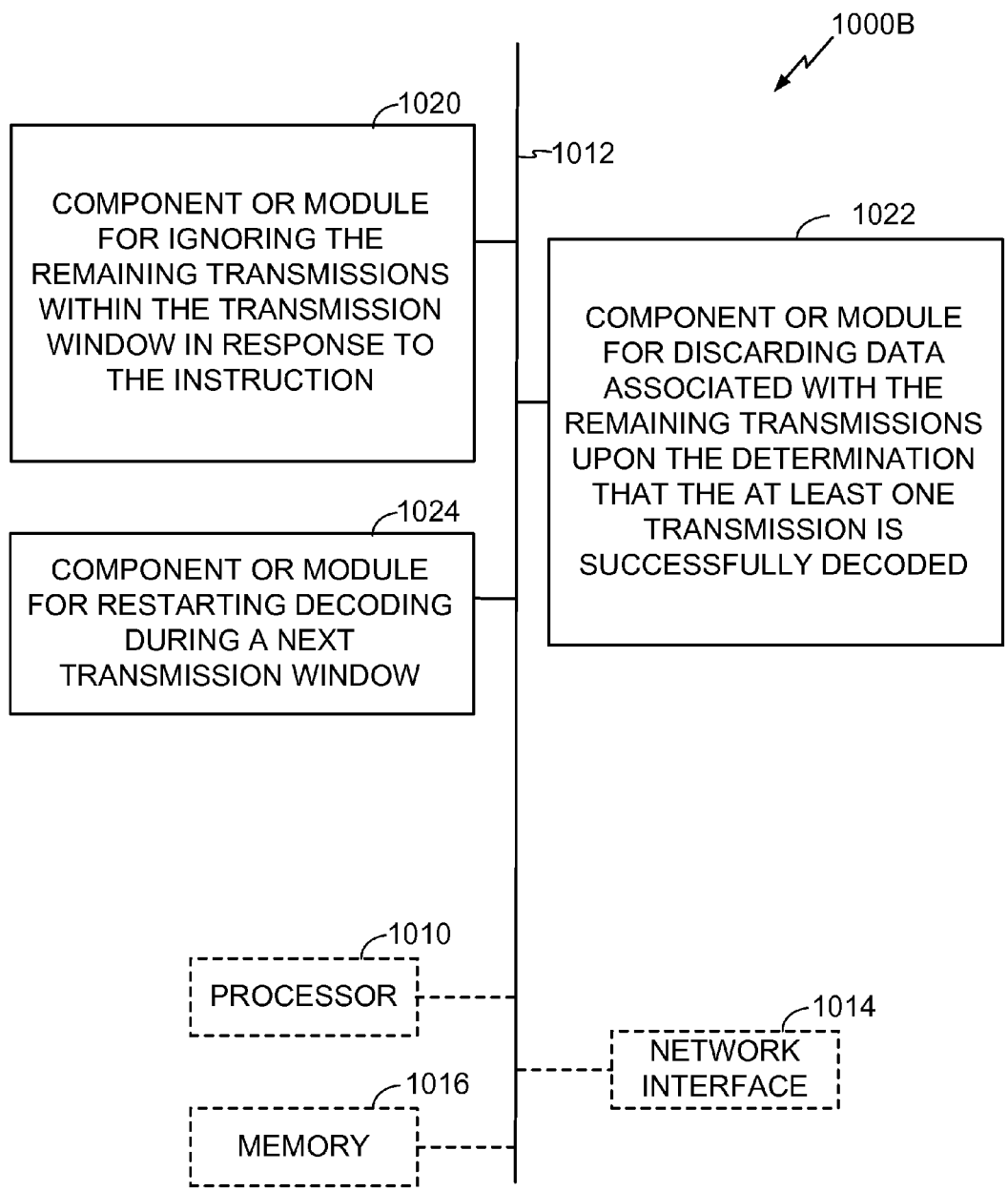

With reference to FIG. 10B, there are shown further optional components or modules 1000B of the apparatus 1000A of FIG. 10A. For example, the apparatus 1000B may further include an electrical component or module 1020 for ignoring the remaining transmissions within the transmission window in response to the instruction. For example, the apparatus 1000B may further include an electrical component or module 1022 for discarding data associated with the remaining transmissions upon the determination that the at least one transmission is successfully decoded. For example, the apparatus 1000B may further include an electrical component or module 1024 for restarting decoding during a next transmission window.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
   receiving a broadcast message to determine a timing of a transmission window;
   receiving, at a user equipment (UE) from a base station, at least one transmission within the transmission window;
   determining, at a first protocol layer, whether the at least one transmission is successfully decoded; and
   instructing a second protocol layer to ignore remaining transmissions from the base station within the transmission window upon a determination that the at least one transmission is successfully decoded, wherein the remaining transmissions and the at least one transmission comprise duplicate copies of a message segment, the remaining transmissions are automatically transmitted by the base station without receiving a negative acknowledgement from the UE for the at least one transmission, and the second protocol layer is lower than the first protocol layer.

2. The method of claim 1, further comprising ignoring, at the second protocol layer, the remaining transmissions within the transmission window in response to the instruction.

3. The method of claim 1, further comprising discarding data associated with the remaining transmissions upon the determination that the at least one transmission is successfully decoded.

4. The method of claim 1, wherein the at least one transmission comprises a segment of an earthquake and tsunami warning system (ETWS) message or a commercial mobile alert system (CMAS) message.

5. The method of claim 4, wherein the transmission window is a system information block type 11 (SIB11) window or a system information block type 12 (SIB12) window.

6. The method of claim 4, further comprising:
   monitoring a paging channel for a paging message; and
   determining whether the paging message includes a notification that the ETWS message or the CMAS message is present;
   wherein the at least one transmission is received in response to a determination that the paging message includes the notification.

7. The method of claim 1, further comprising, upon a determination that the at least one transmission is not successfully decoded, performing the steps of:
   receiving at least one of the remaining transmissions within the transmission window; and
   recombining the at least one transmission with the at least one of the remaining transmissions.

8. The method of claim 1, wherein the at least one transmission includes error-detection code, and determining whether the at least one transmission is successfully decoded is based on the error-detection code.

9. The method of claim 1, wherein the instructing is performed at the UE.

10. A method for wireless communication, comprising:
    receiving a broadcast message to determine a timing of a transmission window;
    receiving at least one transmission within the transmission window;
    determining, at a radio resource control (RRC) layer or a higher protocol layer, whether the at least one transmission is successfully decoded; and
    instructing a physical (PHY) layer to ignore the remaining transmissions within the transmission window upon a determination that the at least one transmission is successfully decoded, wherein the remaining transmissions and the at least one transmission comprise duplicate copies of a message segment.

11. The method of claim 10, further comprising halting decoding, at the PHY layer, of the remaining transmissions within the transmission window in response to the instruction.

12. The method of claim 11, further comprising restarting decoding during a next transmission window.

13. An apparatus for wireless communication, comprising:
    means for receiving a broadcast message to determine a timing of a transmission window;
    means for receiving, from a base station, at least one transmission within the transmission window;
    means for determining, at a first protocol lam whether the at least one transmission is successfully decoded; and
    means for instructing a second protocol layer to ignore remaining transmissions from the base station within the transmission window upon a determination that the at least one transmission is successfully decoded, wherein the remaining transmissions and the at least one transmission comprise duplicate copies of a message segment, the remaining transmissions are automatically transmitted by the base station without receiving a negative acknowledgement from the apparatus for the at least one transmission, and the second protocol layer is lower than the first protocol layer.

14. The apparatus of claim 13, further comprising means for ignoring the remaining transmissions within the transmission window at the second protocol layer in response to the instruction.

15. The apparatus of claim 13, further comprising means for discarding data associated with the remaining transmissions upon the determination that the at least one transmission is successfully decoded.

16. The apparatus of claim 13, wherein the at least one transmission comprises a segment of an earthquake and tsunami warning system (ETWS) message or a commercial mobile alert system (CMAS) message.

17. The apparatus of claim 16, wherein the transmission window is a system information block type 11 (SIB11) window or a system information block type 12 (SIB12) window.

18. The apparatus of claim 16, further comprising:
means for monitoring a paging channel for a paging message; and
means for determining whether the paging message includes a notification that the ETWS message or the CMAS message is present;
wherein the means for receiving the at least one transmission receives the at least one transmission in response to a determination that the paging message includes the notification.

19. The apparatus of claim 13, further comprising:
means for receiving at least one of the remaining transmissions within the transmission window upon a determination that the at least one transmission is not successfully decoded; and
means for recombining the at least one transmission with the at least one of the remaining transmissions.

20. The apparatus of claim 13, wherein the at least one transmission includes error-detection code, and the means for determining whether the at least one transmission is successfully decoded determines whether the at least one transmission is successfully decoded based on the error-detection code.

21. An apparatus for wireless communication, comprising:
means for receiving a broadcast message to determine a timing of a transmission window;
means for receiving at least one transmission within the transmission window;
means for determining, at a radio resource control (RRC) layer or a higher protocol layer, whether the at least one transmission is successfully decoded; and
means for instructing a physical (PHY) layer to ignore the remaining transmissions within the transmission window upon a determination that the at least one transmission is successfully decoded, wherein the remaining transmissions and the at least one transmission comprise duplicate copies of a message segment.

22. The apparatus of claim 21, further comprising means for halting decoding, at the PHY layer, of the remaining transmissions within the transmission window in response to the instruction.

23. The apparatus of claim 22, further comprising means for restarting decoding during a next transmission window.

24. A computer program product, comprising:
a non-transitory computer-readable medium comprising code for causing at least one computer to:
receive a broadcast message to determine a timing of a transmission window;
receive, at a user equipment (UE) from a base station, at least one transmission within the transmission window;
determine, at a first protocol layer, whether the at least one transmission is successfully decoded; and
instruct a second protocol layer to ignore remaining transmissions from the base station within the transmission window upon a determination that the at least one transmission is successfully decoded, wherein the remaining transmissions and the at least one transmission comprise duplicate copies of a message segment, the remaining transmissions are automatically transmitted by the base station without receiving a negative acknowledgement from the UE for the at least one transmission, and the second protocol layer is lower than the first protocol layer.

25. The computer program product of claim 24, wherein the non-transitory computer-readable medium further comprises code for causing the at least one computer to ignore, at the second protocol layer, the remaining transmissions within the transmission window in response to the instruction.

26. The computer program product of claim 24, wherein the non-transitory computer-readable medium further comprising code for causing the at least one computer to discard data associated with the remaining transmissions upon the determination that the at least one transmission is successfully decoded.

27. The computer program product of claim 24, wherein the at least one transmission comprises a segment of an earthquake and tsunami warning system (ETWS) message or a commercial mobile alert system (CMAS) message.

28. The computer program product of claim 27, wherein the transmission window is a system information block type 11 (SIB11) window or a system information block type 12 (SIB12) window.

29. The computer program product of claim 27, wherein the non-transitory computer-readable medium further comprises code for causing the at least one computer to:
monitor a paging channel for a paging message; and
determine whether the paging message includes a notification that the ETWS message or the CMAS message is present;
wherein the code for causing the at least one computer to receive at least one transmission comprises code for causing the at least one computer to receive the at least one transmission in response to a determination that the paging message includes the notification.

30. The computer program product of claim 24, wherein the non-transitory computer-readable medium further comprises code for causing the at least one computer to:
receive at least one of the remaining transmissions within the transmission window upon a determination that the at least one transmission is not successfully decoded; and
recombine the at least one transmission with the at least one of the remaining transmissions.

31. The computer program product of claim 24, wherein the at least one transmission includes error-detection code, and the code for causing the at least one computer to determine comprises code for causing the at least one computer to determine whether the at least one transmission is successfully decoded based on the error-detection code.

32. A computer program product, comprising:
a non-transitory computer-readable medium comprising code for causing at least one computer to:
receive a broadcast message to determine a timing of a transmission window;
receive at least one transmission within the transmission window; determine, at a radio resource control (RRC) layer or a higher protocol layer, whether the at least one transmission is successfully decoded; and
instruct a physical (PHY) layer to ignore the remaining transmissions within the transmission window upon a determination that the at least one transmission is successfully decoded, wherein the remaining transmissions and the at least one transmission comprise duplicate copies of a message segment.

33. The computer program product of claim 32, wherein the non-transitory computer-readable medium comprises code for causing the at least one computer to halt decoding, at the PHY layer, of the remaining transmissions within the transmission window in response to the instruction.

34. The computer program product of claim 33, wherein the non-transitory computer-readable medium further comprises code for causing the at least one computer to restart decoding during a next transmission window.

35. An apparatus for wireless communication, comprising:
at least one transceiver configured to receive a broadcast message to determine a timing of a transmission window, and to receive, from a base station, at least one transmission within the transmission window;
at least one processor configured to determine, at a first protocol layer, whether the at least one transmission is successfully decoded, and to instruct a second protocol layer to ignore remaining transmissions from the base station within the transmission window upon a determination that the at least one transmission is successfully decoded, wherein the remaining transmissions and the at least one transmission comprise duplicate copies of a message segment, the remaining transmissions are automatically transmitted by the base station without receiving a negative acknowledgement from the apparatus for the at least one transmission, and the second protocol layer is lower than the first protocol layer; and
a memory coupled to the at least one processor.

36. The apparatus of claim 35, wherein the at least one processor is configured to ignore, at the second protocol layer, the remaining transmissions within the transmission window in response to the instruction.

37. The apparatus of claim 35, wherein the at least one processor is configured to discard data associated with the remaining transmissions upon the determination that the at least one transmission is successfully decoded.

38. The apparatus of claim 35, wherein the at least one transmission comprises a segment of an earthquake and tsunami warning system (ETWS) message or a commercial mobile alert system (CMAS) message.

39. The apparatus of claim 38, wherein the transmission window is a system information block type 11 (SIB11) window or a system information block type 12 (SIB12) window.

40. The apparatus of claim 38, wherein at least one transceiver is configured to monitor a paging channel for a paging message, and the at least one processor is configured to determine whether the paging message includes a notification that the ETWS message or the CMAS message is present, wherein the at least one transceiver is configured to receive the at least one transmission in response to a determination that the paging message includes the notification.

41. The apparatus of claim 35, wherein the at least one transceiver is configured to receive at least one of the remaining transmissions within the transmission window upon a determination that the at least one transmission is not successfully decoded, and the at least one processor is configured to recombine the at least one transmission with the at least one of the remaining transmissions.

42. The apparatus of claim 35, wherein the at least one transmission includes error-detection code, and the at least one processor is configured to determine whether the at least one transmission is successfully decoded based on the error-detection code.

43. An apparatus for wireless communication, comprising:
at least one transceiver configured to receive a broadcast message to determine a timing of a transmission window, and to receive at least one transmission within the transmission window;
at least one processor configured to determine whether the at least one transmission is successfully decoded at a radio resource control (RRC) layer or a higher protocol layer, and to instruct a physical (PHY) layer to ignore the remaining transmissions within the transmission window upon a determination that the at least one transmission is successfully decoded, wherein the remaining transmissions and the at least one transmission comprise duplicate copies of a message segment.

44. The apparatus of claim 43, wherein the at least one processor is configured to ignore the remaining transmissions by halting decoding, at the PHY layer, of the remaining transmissions.

45. The apparatus of claim 44, wherein the at least one processor is configured to restart decoding during a next transmission window.

* * * * *